United States Patent [19]

Suzuki

[11] 3,923,114
[45] Dec. 2, 1975

[54] SOUND ARRESTING DEVICE IN A VEHICLE FOR USE IN CONSTRUCTION WORK

[75] Inventor: Yasuo Suzuki, Hirakata, Japan

[73] Assignee: Kabushiki Kaisha Komatsu Seisakusho, Japan

[22] Filed: July 2, 1974

[21] Appl. No.: 485,229

[30] Foreign Application Priority Data
Aug. 14, 1973  Japan............................ 48-90539

[52] U.S. Cl............................. 180/54 A; 181/33 K
[51] Int. Cl.²........................................ B60K 11/04
[58] Field of Search....... 181/33 K; 180/54 A, 69 R, 180/69 C, 68 P

[56] References Cited
UNITED STATES PATENTS

| | | | |
|---|---|---|---|
| 1,884,195 | 10/1932 | Peterson...................... | 180/68 P X |
| 2,231,586 | 2/1941 | Miller............................ | 180/64 A |
| 3,762,489 | 10/1973 | Proksch et al. ................. | 180/69 R |
| 3,812,927 | 5/1974 | Kawamura..................... | 180/54 A |
| 3,820,629 | 6/1974 | Carlson et al................ | 180/69 R X |

FOREIGN PATENTS OR APPLICATIONS
873,659    4/1953    Germany......................... 181/33 K 1,034,340    4/1953    France............................ 180/54 A

*Primary Examiner*—M. Henson Wood, Jr.
*Assistant Examiner*—Milton L. Smith
*Attorney, Agent, or Firm*—Armstrong, Nikaido & Wegner

[57] ABSTRACT

A sound arresting device in a vehicle for use in construction work having an engine room housing therein an engine and fan means for cooling the engine and fender means extending along either side of the chasis of the vehicle. The engine room is formed in a closed construction and lined with sound absorbing material except for the suction openings designed to receive cooling air and the fender means which are in the form of duct openings at the forward ends of the engine room and at its rear end to connect into the atmosphere, with the interior of the ducts being lined with sound absorbing material; thus, the sound produced in the engine room is substantially attenuated by the linings before the cooling air is discharged through the fender means.

3 Claims, 6 Drawing Figures

3,923,114

SOUND ARRESTING DEVICE IN A VEHICLE FOR USE IN CONSTRUCTION WORK

BACKGROUND OF THE INVENTION

The present invention relates to a sound arresting device in a vehicle for use in construction work.

In a vehicle for use in construction work such as a bulldozer, a fan means is provided in the engine room so as to produce a stream of cooling air which flows through a radiator means so that the cooling liquid circulating in the radiator means and the engine can cool the engine. The cooling air is discharged from the engine room with sound produced by the engine and the fan means being contained therein. Therefore, the level of noise produced by the vehicle is very high thereby rendering the vehicle a source of noise.

Further, since the engine must be at all times cooled during its operation, the engine rooms heretofore used could not be made as a closed structure.

SUMMARY OF THE INVENTION

The object of the present invention is to provide a novel and useful sound arresting device in a vehicle for use in construction work which avoids the disadvantages in the prior art devices as described above.

The above object is achieved in accordance with the present invention by providing a sound arresting device in a vehicle for use in construction work having a chasis, an engine room or compartment provided at the forward end of the chasis and formed with air suction openings, an engine housed in the engine room for driving the vehicle, a fan means provided in the engine room for directing cooling air sucked in the engine room through the suction openings toward the engine to cool the same, and fender means extending longitudinally at either side of the chasis from the engine room to the rear end of the chasis, the device being characterized in that the engine room is formed as a closed construction except for the suction openings, with a lining of sound absorbing material being applied to the inner walls of the engine room except for the suction openings, each of the fender means being constructed in the form of a duct, opening at its forward end into the engine room and at its rear end into atmosphere, with a lining of sound absorbing material being applied to the inner wall of each fender means, thereby permitting sound produced in the engine room and contained in the cooling air to be substantially attenuated by the linings in the engine room and the fender means before the cooling air is discharged from the fender means.

In accordance with one feature of the present invention, the suction openings are in the form of louvers having a plurality of blades and located on either side of the engine room and each of the blades having a lining of sound absorbing material applied thereon so that the sound is effectively attenuated.

In accordance with another feature of the present invention, the suction openings are formed by a plurality of blades extending in parallel to each other in spaced relationship from each other at the forward end of the engine room and each of the blades comprises an elongated hollow member filled with sound absorbing material therein, at least a side wall of the blade being perforated so as to effectively absorb sound by the sound absorbing material in the blade. The angular position of each blade, about the longitudinal axis thereof, being adjustable so that the cooling effect can be adjusted.

DETAILED DESCRIPTION OF THE PREFERRED EMBODIMENT

Figure 1:
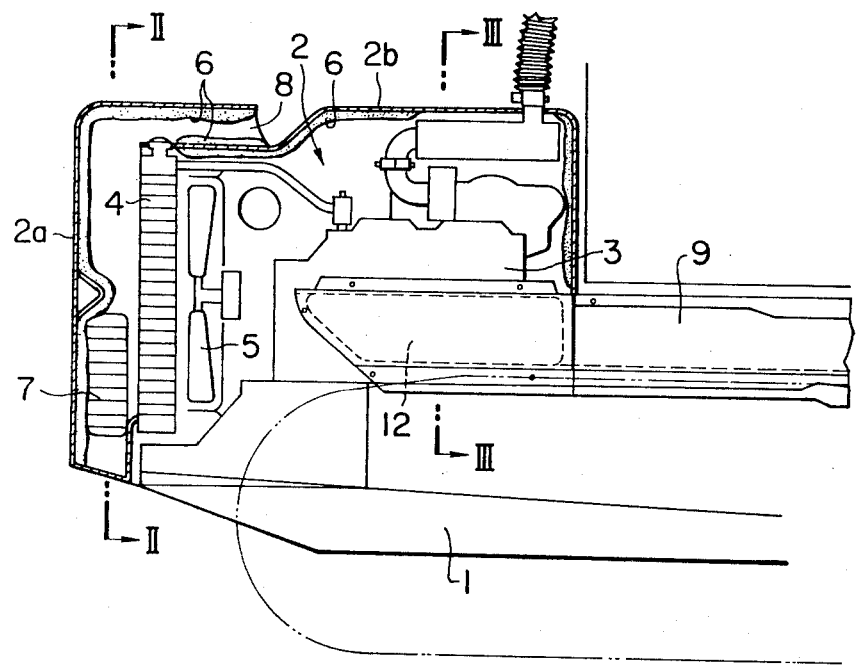
FIG. 1 is a fragmentary elevational view partly in section showing the construction of the first embodiment of the sound arresting device of the present invention.

Referring to FIG. 1 showing the first embodiment of the present invention, the chasis 1 of a vehicle such as a bull-dozer is provided at its forward end with an engine room or compartment 2. An engine 3 is located in the engine room 2 for driving the vehicle through a transmission means (not shown). A radiator 4 is arranged in the engine room 2 in front of the engine 3 and a fan 5 is interposed between the radiator 4 and the engine 3. Air which flows through the radiator 4 by the fan 5 cools the cooling liquid in the radiator 4 and the cooled liquid is circulated in the engine 3 through lines connecting the radiator 4 to the engine 3 so that the engine 3 is cooled during the operation thereof.

The engine room 2 is formed as a closed construction by the forward face plate 2a and the bonnet 2b and linings 6 of sound absorbing material are applied to the inner wall of the engine room 2.

Figure 2:
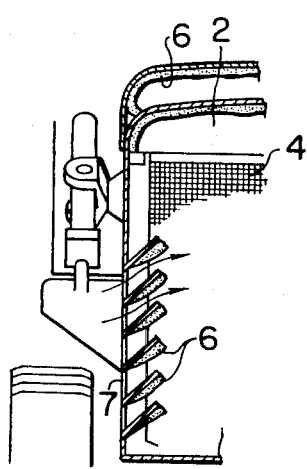
FIG. 2 is a fragmentary cross-sectional view along line II — II in FIG. 1.

Air suction opening 7 in the form of louvers are provided on either side of the engine room 2 adjacent to the forward end thereof. A second suction opening 18 is also provided at the upper wall of the engine room 2 as shown. As shown in FIGS. 1 and 2, linings 6 are applied to the inner wall of the suction opening 8 and to each of the blades forming the louver of the air suction openings 7.

A fender 9 in the form of a conduit is provided on either side of the chasis 1 and extends longitudinally along the chasis 1 from the engine room 2 to the rear of the chasis 1. The piping arrangement 10 for the hydraulic and pneumatic means in the vehicle is located in the fender 9 so as to protect the piping while saving space in the vehicle.

The characteristic feature of the present invention lies in the utilization of the fenders 9 as a cooling air conducting means.

Figure 3:
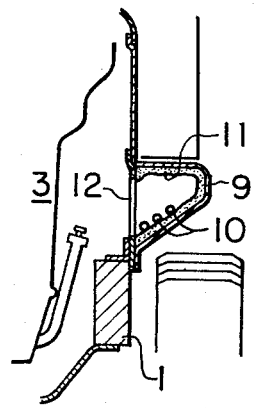
FIG. 3 is a fragmentary cross-sectional view along line III — III in FIG. 1.

To this end, the forward end of the respective fender 9, on either side communicates with the interior of the engine room 2 through an opening 12 provided in the appropriate side wall of the engine room 2 and a lining 11 of sound absorbing material is applied to the inner wall of each of the fenders 9 as shown in FIG. 3. The rear end of the respective fender 9 opens to the atmosphere. Thus, the cooling air introduced in the engine room 2 by the fan 5 flows through the respective opening 12 and the respective fender 9 and is discharged from the fender 9 to the atmosphere.

In operation, when the fan 5 is driven as the engine 3 is rotated, cooling air is introduced from the suction openings 7, 8 into the engine room 2 and flows through the radiator 4 by the action of the fan 5 so that the cooling liquid in the radiator 4 is cooled and then circulated through the engine 3 to cool the same. The cooling air containing the noise produced by the fan 5 and the engine 3 flows through the respective opening 12 and the respective fender 9 in the form of a duct, and is discharged from the fender 9 at the rear of the vehicle.

As described above, since the engine room 2 itself is of a closed construction, and is provided with lining 6 of sound absorbing material on the inner wall thereof, sound is prevented from being emitted directly out of the engine room 2 and is, instead, absorbed by the lining 6 so that the sound contained in the cooling air passing through the openings 12 is greatly attenuated. In addition, the cooling air passes through the fenders 9, the sound remaining in the cooling air is substantially absorbed by the lining 11 of sound absorbing material so that the air discharged from the fenders 9 is made substantially noiseless.

By the construction described above, the flow efficiency of the cooling air is increased so that the cooling efficiency of the engine 3 is improved, while overheating of the engine room 2 which otherwise might occur due to the closed construction thereof is positively avoided.

Figure 4:
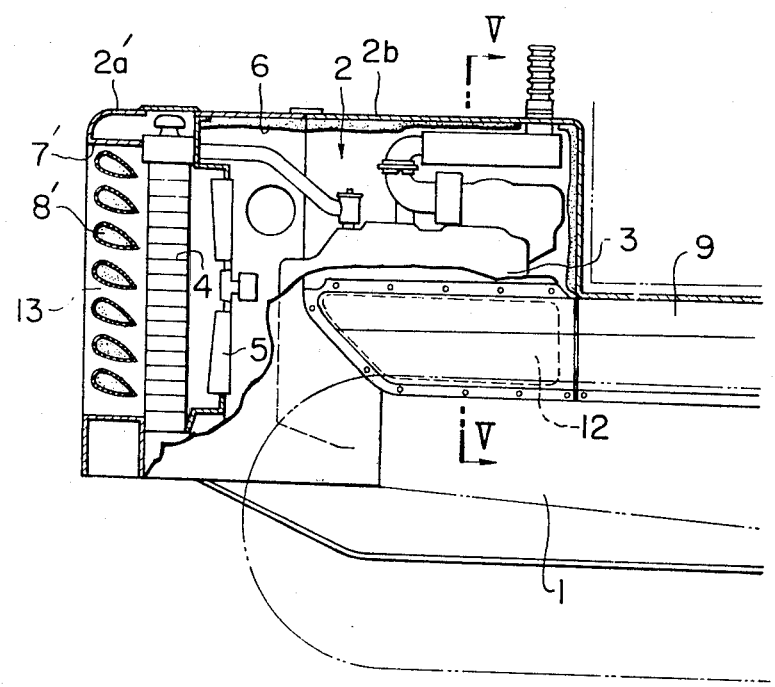
FIG. 4 is a fragmentary elevational view partly in section showing the second embodiment of the present invention.
Figure 5:
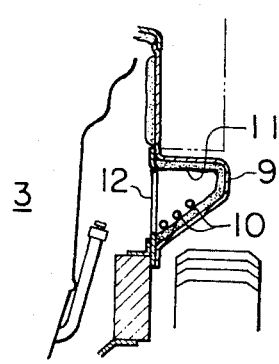
FIG. 5 is a fragmentary cross-sectional view along line V — V in FIG. 4.
Figure 6:
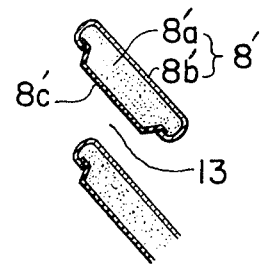
FIG. 6 is a fragmentary cross-sectional view showing in detail the construction of the blades incorporated in the embodiment of FIG. 4.

FIGS. 4–6 show the second embodiment of, the present invention. This embodiment is substantially similar to that of FIGS. 1-3 except that, instead of the provision of the suction openings 7, 8 of FIG. 1, suction openings are formed by an opening 7' at the forward end face of the engine room 2 and a plurality of blades 8' extending in parallel to each other and in spaced relationship from each other in the opening 7' thereby providing flow passages 13 therebetween.

As shown in FIGS. 4 and 6, each of the blades 8' is of streamlined configuration in cross-section and supported in the opening 7' rotatably about its longitudinal axis so that the flow rate of the can be adjusted.

As shown in FIG. 6, each of the blades 8' comprises an elongated hollow member 8'b filled with sound absorbing material 8'a therein. A side wall 8'c is perforated so that sound is effectively absorbed by the sound absorbing material in the member 8'b through the perforations formed in the side wall 8'c.

The operation and effectiveness of the device of FIGS. 4–6 are similar to those of FIGS. 1–3.

In the above described embodiments, the fan is shown as being a suction type fan. However, a push type fan may be used in order to obtain the same effect obtainable by the suction type fan.

I claim:

1. A sound arresting device in a vehicle for use in construction work having a chasis, an engine compartment provided at the forward end of said chasis and formed with air suction openings, an engine housed in said engine compartment for driving said vehicle, fan means provided in said engine compartment for directing cooling air sucked in said engine compartment through said suction openings toward said engine to cool the same, and fender means extending longitudinally on either side of said chasis from said engine compartment to the rear end of said chasis, wherein the improvement comprises said engine compartment being formed in a closed construction except for said suction openings, a lining of sound absorbing material applied to the inner walls of said engine compartment except for said suction openings, each of said fender means being constructed in the form of a duct opening at its forward end into said engine compartment and at its rear end into atmosphere, with a lining of sound absorbing material applied to the inner wall of each said fender means, thereby permitting sound produced in said engine compartment and contained in said cooling air to be substantially attenuated by said linings in said engine compartment and said fender means before said cooling air is discharged from said fender means, wherein one of said suction openings is provided at the top of said engine compartment while the remaining suction openings are provided at either side of said engine compartment adjacent to the forward end thereof and are in the form of louvers having a plurality of blades, each of said blades being provided thereon with a lining of sound absorbing material.

2. A sound arresting device in a vehicle for use in construction work having a chasis, an engine compartment provided at the forward end of said chasis and formed with air suction openings, an engine housed in said engine compartment for driving said vehicle, fan means provided in said engine compartment for directing cooling air sucked in said engine compartment through said suction openings toward said engine to cool the same, and fender means extending longitudinally on either side of said chasis from said engine compartment to the rear end of said chasis, wherein the improvement comprises said engine compartment being formed in a closed construction except for said suction openings, a lining of sound absorbing material applied to the inner walls of said engine compartment except for said suction openings, each of said fender means being constructed in the form of a duct opening at its forward end into said engine compartment and at its rear end into atmosphere, with a lining of sound absorbing material applied to the inner wall of each said fender means, thereby permitting sound produced in said engine compartment and contained in said cooling air to be substantially attenuated by said linings in said engine compartment and said fender means before said cooling air is discharged from said fender means, wherein said suction openings are provided at the forward end of said engine compartment and are formed by a plurality of blades extending in parallel to each other across the forward end of said engine compartment in spaced relationship from each other, each of said blades being formed by an elongated hollow member filled with sound absorbing material therein, at least a side wall of said blade being perforated so as to permit sound to be absorbed by said absorbing material in said blade.

3. A sound arresting device according to claim 2, wherein the angular position each of said blades about the longitudinal axis thereof is adjustable.

* * * * *